United States Patent
Sone et al.

(10) Patent No.: US 6,804,227 B1
(45) Date of Patent: Oct. 12, 2004

(54) TRUNK LINE BANDWIDTH RESERVATION SYSTEM FOR ASYNCHRONOUS TRANSFER MODE SWITCHING SYSTEM

(75) Inventors: Yukio Sone, Kawasaki (JP); Takashi Kato, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/779,919

(22) Filed: Jan. 9, 1997

Related U.S. Application Data

(63) Continuation of application No. 08/421,007, filed on Apr. 12, 1995, now abandoned, which is a continuation of application No. 08/089,963, filed on Jul. 9, 1993, now abandoned.

(30) Foreign Application Priority Data

Jul. 10, 1992 (JP) .............................................. 4-183561

(51) Int. Cl.⁷ .......................... H04L 12/50; H04Q 11/00
(52) U.S. Cl. ................ 370/368; 370/395.41; 370/395.1
(58) Field of Search .......................... 370/395.1, 395.4, 370/395.41, 465, 468, 431

(56) References Cited

U.S. PATENT DOCUMENTS

| | | | | |
|---|---|---|---|---|
| 4,870,408 A | * | 9/1989 | Zdunek et al. ............. | 370/95.1 |
| 5,065,393 A | * | 11/1991 | Sibbitt et al. ............... | 370/360 |
| 5,172,375 A | * | 12/1992 | Kou .......................... | 370/95.3 |
| 5,231,631 A | * | 7/1993 | Buhrke et al. ................ | 370/60 |
| 5,255,266 A | * | 10/1993 | Watanabe et al. ........... | 370/60.1 |
| 5,258,979 A | * | 11/1993 | Oomuro et al. ............. | 370/95.1 |
| 5,265,091 A | * | 11/1993 | Van Landegem ............ | 370/60 |

* cited by examiner

Primary Examiner—Ajit Patel
(74) Attorney, Agent, or Firm—Katten Muchin Zavis Rosenman

(57) ABSTRACT

A trunk line bandwidth reservation system is applied to an asynchronous transfer mode switching system which is coupled to a plurality of terminals. The trunk line bandwidth reservation system includes a data storage for storing reservation data, a bandwidth reservation part for registering a reservation datum which includes at least a time zone and a reserved bandwidth to be used by a reserved communication into the data storage in response to a reservation request which includes the reservation datum and is generated from a first terminal before the time zone, where the time zone starts from a reserved start time, and a bandwidth assignment part for assigning the reserved bandwidth to the first terminal in response to a connect request which is generated from the first terminal at the reserved start time, and for assigning an available bandwidth to a second terminal in response to a connect request which is generated from the second terminal by judging the available bandwidth based on a bandwidth which is presently in use and the reserved bandwidth which is secured by the reservation datum. The second terminal is other than the first terminal and generates the connect request which is no associated with a reservation request.

14 Claims, 9 Drawing Sheets

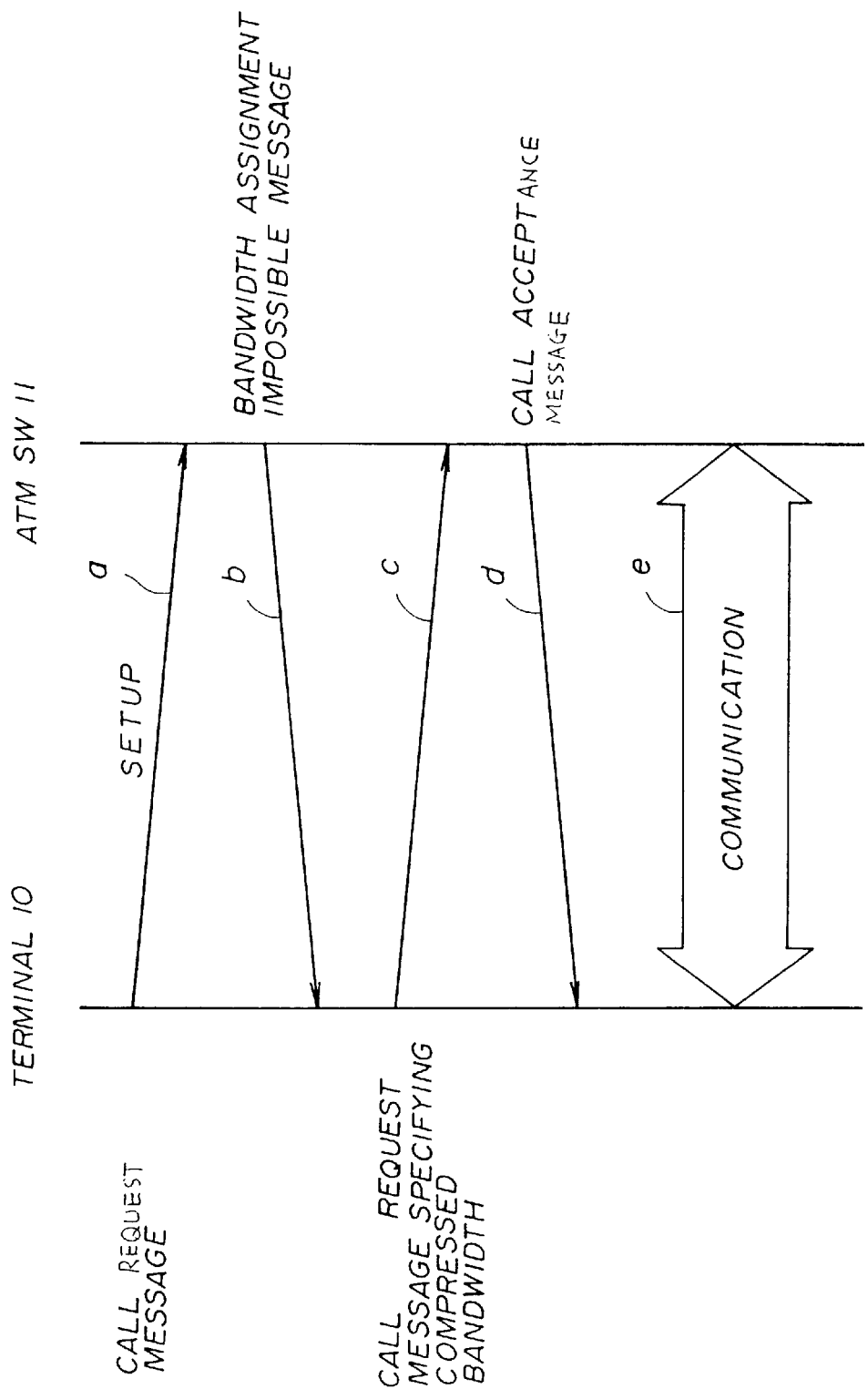

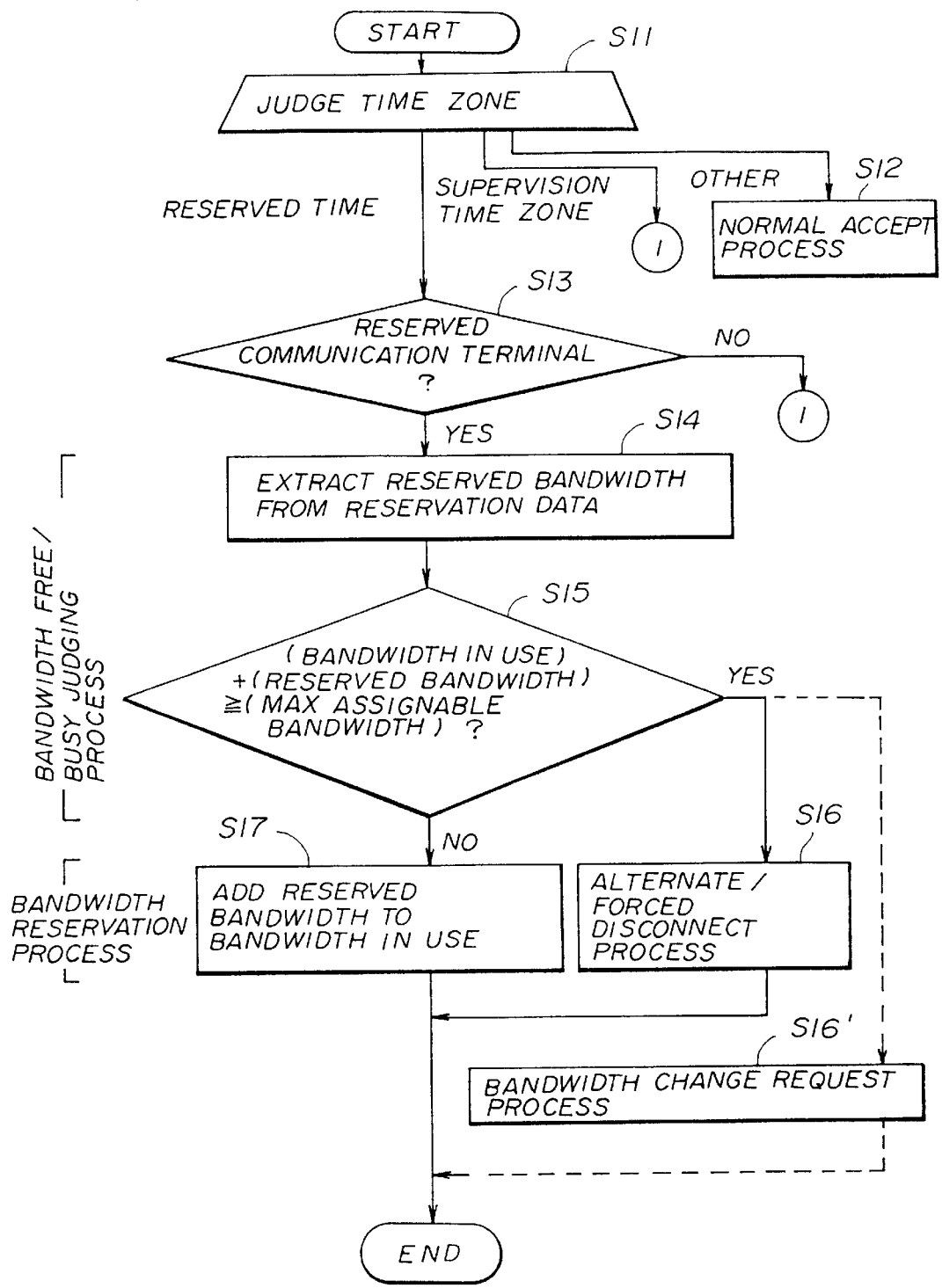

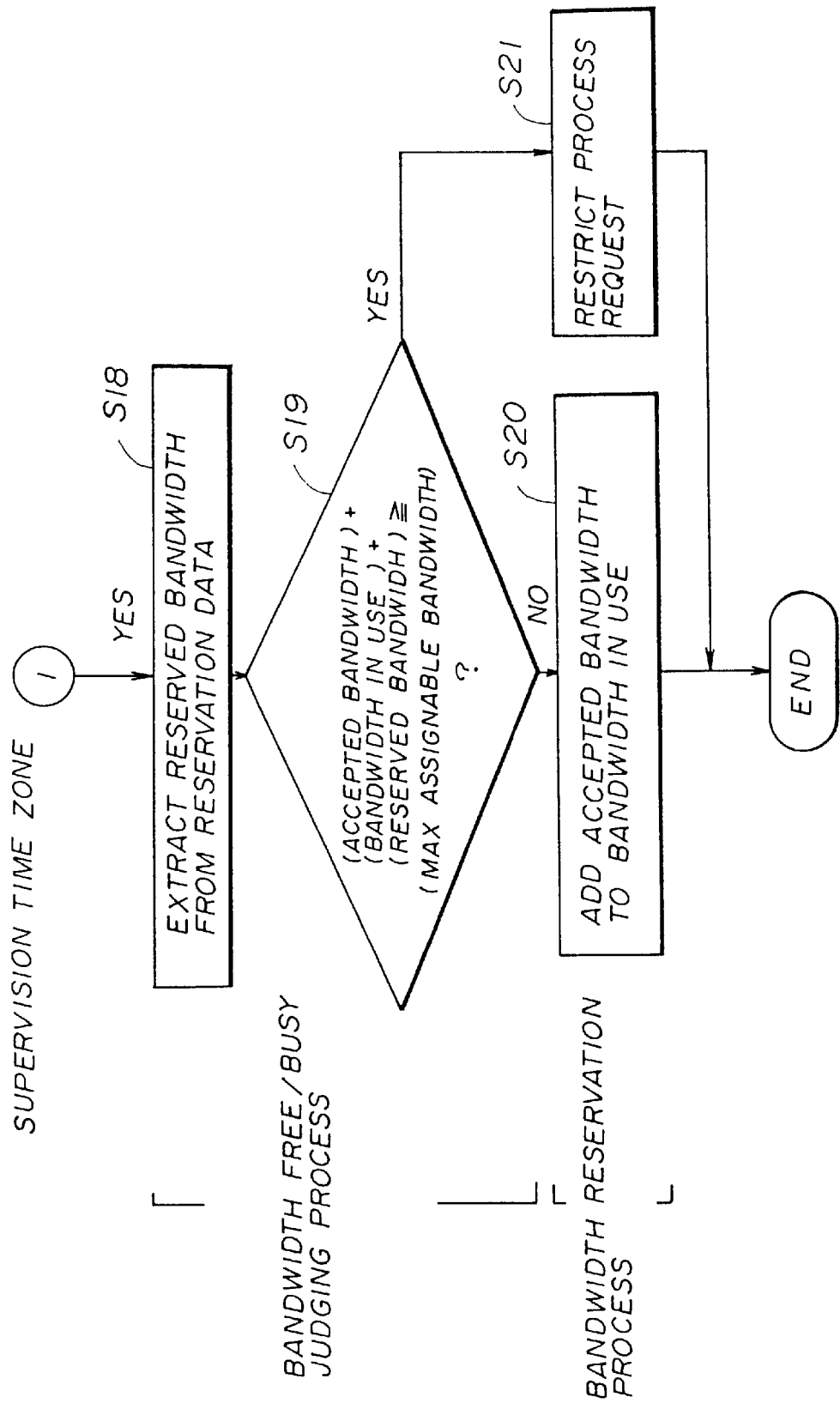

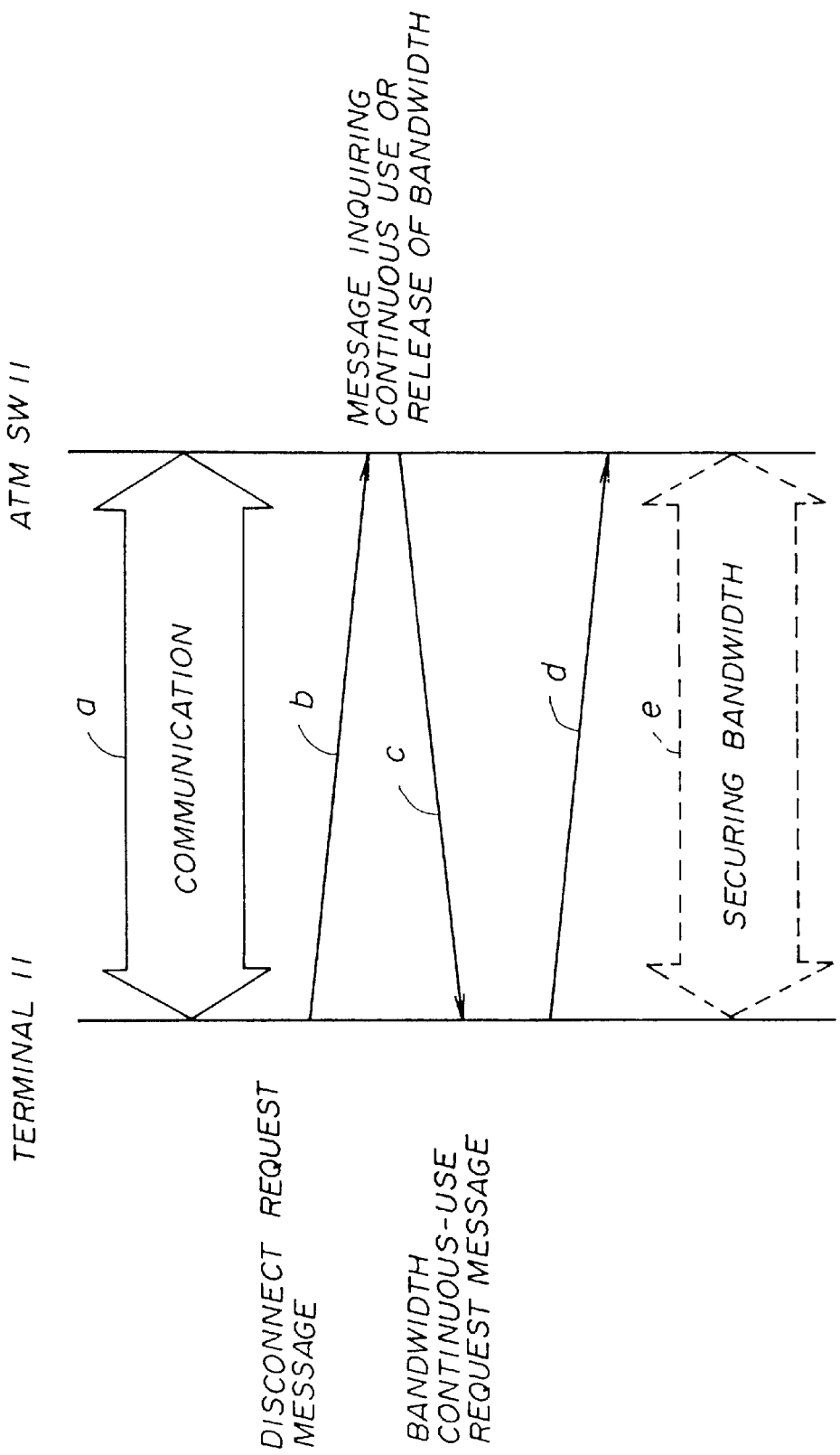

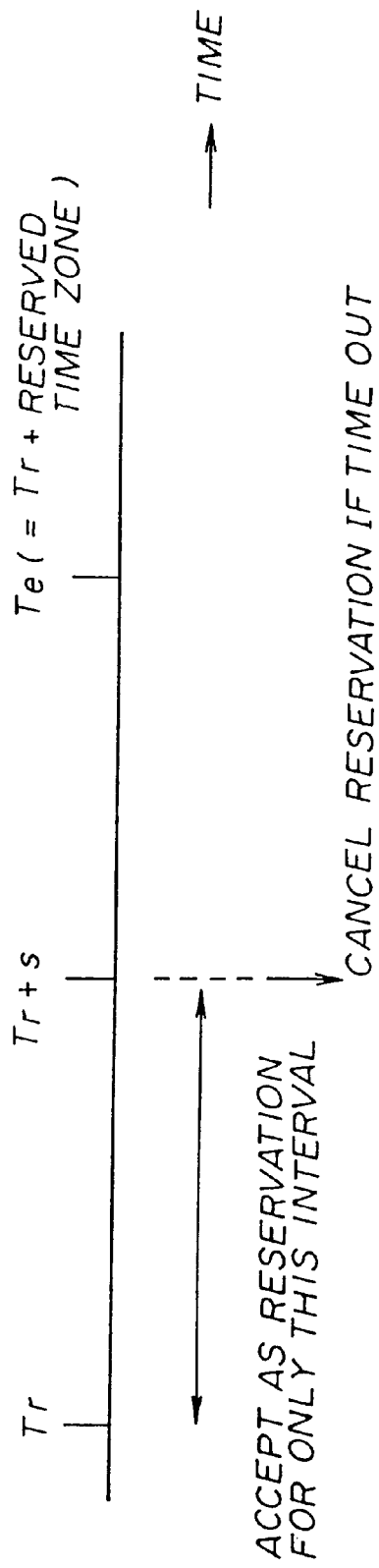

TRUNK LINE BANDWIDTH RESERVATION SYSTEM FOR ASYNCHRONOUS TRANSFER MODE SWITCHING SYSTEM

This is a continuation of application Ser. No. 08/421,007, filed Apr. 12, 1995 now abandoned, which is a continuation of Ser. No. 08/089,963, filed Jul. 9, 1993, now abandoned.

BACKGROUND OF THE INVENTION

The present invention generally relates to trunk line bandwidth reservation systems, and more particularly to a trunk line bandwidth reservation system for reserving in an asynchronous transfer mode (ATM) switching system a bandwidth which will be required by a user when the user makes a communication.

According to the ATM switching system which forms a basis for realizing a broadband integrated services digital network (B-ISDN), various media may use transmission lines in common. On the other hand, there are demands to guarantee the service quality by assigning a bandwidth with respect to the medium in which the transmission speed varies with time.

Bandwidth assigning techniques using the statistical multiplexing effect or the like have been proposed. However, there is a problem in that it is difficult to accept a call in the medium which requires a broadband. Because this problem must be eliminated in order to guarantee the communication service quality, it is necessary for the switching system to control the bandwidth assignment with respect to the users so that the required bandwidth is secured.

In a conventional bandwidth assigning technique in the ATM switching system, the user declares parameters related to the bandwidth which will be used for the communication. The declared parameters include a maximum speed, an average speed, service quality class identifier and the like. The ATM switching system fixedly assigns the bandwidths starting from the free bandwidth which can be used for the transmission or, assigns the bandwidths on a probability basis, based on the declared parameters. In this case, the bandwidths which are used differ depending on the kind of medium such as audio, data and image and depending on the different speeds of the media. When transmitting the image, the transmission rate is on the order of several tens of Mbps and a relatively large bandwidth is used. The image transmission can provide various kinds of services such as point-to-point image communication, video conference, and broadcasting from a transmitting station to a plurality of receiving stations.

According to the conventional bandwidth assigning technique described above, the bandwidth assignment is made by the switching system at the time when the user actually makes the communication by declaring the parameters. For this reason, even if a bandwidth assignment for a broadband is requested at a predetermined time in order to make the image broadcast communication described above, for example, the free bandwidth which can be used for this communication may be insufficient depending on the state of use of the transmission lines. In this case, the image broadcast communication cannot be accepted, and there is a problem in that the system cannot provide the service with respect to the user.

SUMMARY OF THE INVENTION

Accordingly, it is a general object of the present invention to provide a novel and useful trunk line bandwidth reservation system in which the problem described above is eliminated.

Another and more specific object of the present invention is to provide a trunk line bandwidth reservation system for an asynchronous transfer mode switching system which is coupled to a plurality of terminals, comprising data storage means for storing reservation data, bandwidth reservation means, coupled to the data storage means, for registering a reservation datum which includes at least a time zone and a reserved bandwidth to be used by a reserved communication into the data storage means in response to a reservation request which includes the reservation datum and is generated from a first terminal before the time zone, where the time zone starts from a reserved start time, and bandwidth assignment means, coupled to the bandwidth reservation means, for assigning the reserved bandwidth to the first terminal in response to a connect request which is generated from the first terminal at the reserved start time, and for assigning an available bandwidth to a second terminal in response to a connect request which is generated from the second terminal by judging the available bandwidth based on a bandwidth which is presently in use and the reserved bandwidth which is secured by the reservation datum, where the second terminal is other than the first terminal and generates the connect request which is no associated with a reservation request, and the data storage means, the bandwidth reservation means and the bandwidth assignment means are provided within the asynchronous transfer mode switching system. According to the trunk line bandwidth reservation system of the present invention, it is possible to positively assign the requested bandwidth to each user. As a result, it is possible to stably provide services of a high quality, including services related to image transmission. Therefore, it is possible to improve the reliability of the communication system which employs the present invention.

Other objects and further features of the present invention will be apparent from the following detailed description when read in conjunction with the accompanying drawings.

BRIEF DESCRIPTION OF THE DRAWINGS

FIG. 4 is a sequence diagram for explaining the exchange of messages between a terminal and an ATM switching system at the start of a reserved communication;

FIG. 5 is a flow chart for explaining a connect request accept process;

FIG. 6 is a flow chart for explaining the connect request accept process;

FIG. 8 is a sequence diagram for explaining the exchange of messages between the terminal and the ATM switching system at the end of the reserved communication; and FIG. 9 is a time chart for explaining the case where no connect request is made at the reserved time.

DESCRIPTION OF THE PREFERRED EMBODIMENTS

First, a description will be given of the operating principle of the present invention, by referring to FIG. 1.

Figure 1:
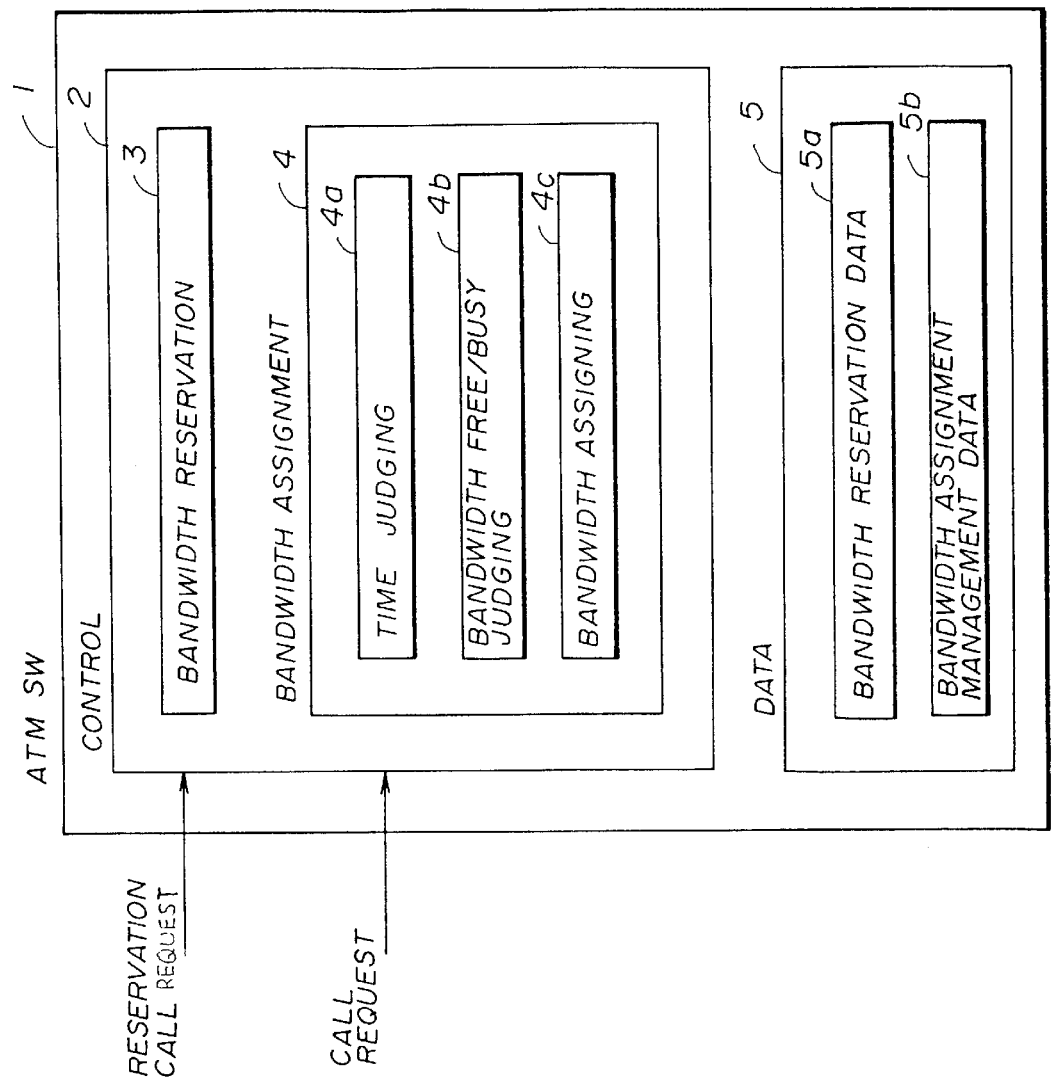
FIG. 1 is a diagram for explaining the operating principle of the present invention.

In FIG. 1, an ATM switching system 1 includes a control part 2 and a data part 5. The control part 2 includes a bandwidth reservation part 3 which carries out the process of reserving the time zone and the bandwidth to be used for the communication prior to the communication, and a bandwidth assignment part 4 which assigns the bandwidths in response to a call request depending on the free/busy state of the bandwidths by taking into consideration the reservation data depending on the time. This bandwidth assignment part 4 includes a time judging means 4a for judging the present time, a bandwidth free/busy judging means 4b, and a bandwidth assigning means 4c. The data part 5 includes bandwidth reservation data 5a, and bandwidth assignment management data 5b.

In the present invention, the bandwidth which is to be used for a communication which starts at a fixed time, such as a broadcast communication, is reserved in advance. When assigning the bandwidths, the reserved bandwidth is secured by taking into consideration the bandwidth which is reserved by the reservation datum.

When a terminal of the user who makes the communication at the fixed time calls to make the reservation, the bandwidth reservation part 3 of the control part 2 receives the reservation datum from this terminal. The reservation datum is stored in the data part 5 as a bandwidth reservation datum 5a. This bandwidth reservation datum 5a includes the time, the bandwidth and the like. If the time is not specified, the reserved bandwidth is constantly secured.

The bandwidth assignment part 4 judges the present time by the time judging means 4a when a call request specifying the bandwidth is made from the terminal which made the reservation in advance. The bandwidth assignment part 4 judges whether or not the present time falls within the time zone specified by the bandwidth reservation datum 5a. If the present time matches the time specified by the bandwidth reservation datum 5a, the bandwidth free/busy judging means 4b of the bandwidth assignment part 4 judges whether or not the reserved bandwidth is free or busy, based on the band assignment management data 5b. If the reserved bandwidth is free, the bandwidth assigning means 4c updates the data of the bandwidth assignment management data 5b in use, and enables the communication by assigning the reserved bandwidth to the terminal of the user who made the reservation in advance.

With respect to the terminal which did not make a reservation in advance, the bandwidth assignment part 4 takes into consideration the bandwidth which is in use and is stored in the bandwidth assignment management data 5b at that time, and the bandwidth which is scheduled to be used and is registered in the bandwidth reservation datum 5a. Based on these considerations, the bandwidth free/busy judging means 4b of the bandwidth assignment part 4 judges whether or not a free bandwidth exists, and if a free bandwidth exists, the bandwidth assigning means 4c assigns the requested free bandwidth to the terminal which did not make the reservation in advance.

Next, a description will be given of an embodiment of the trunk line bandwidth reservation system according to the present invention, by referring to FIG. 2.

Figure 2:
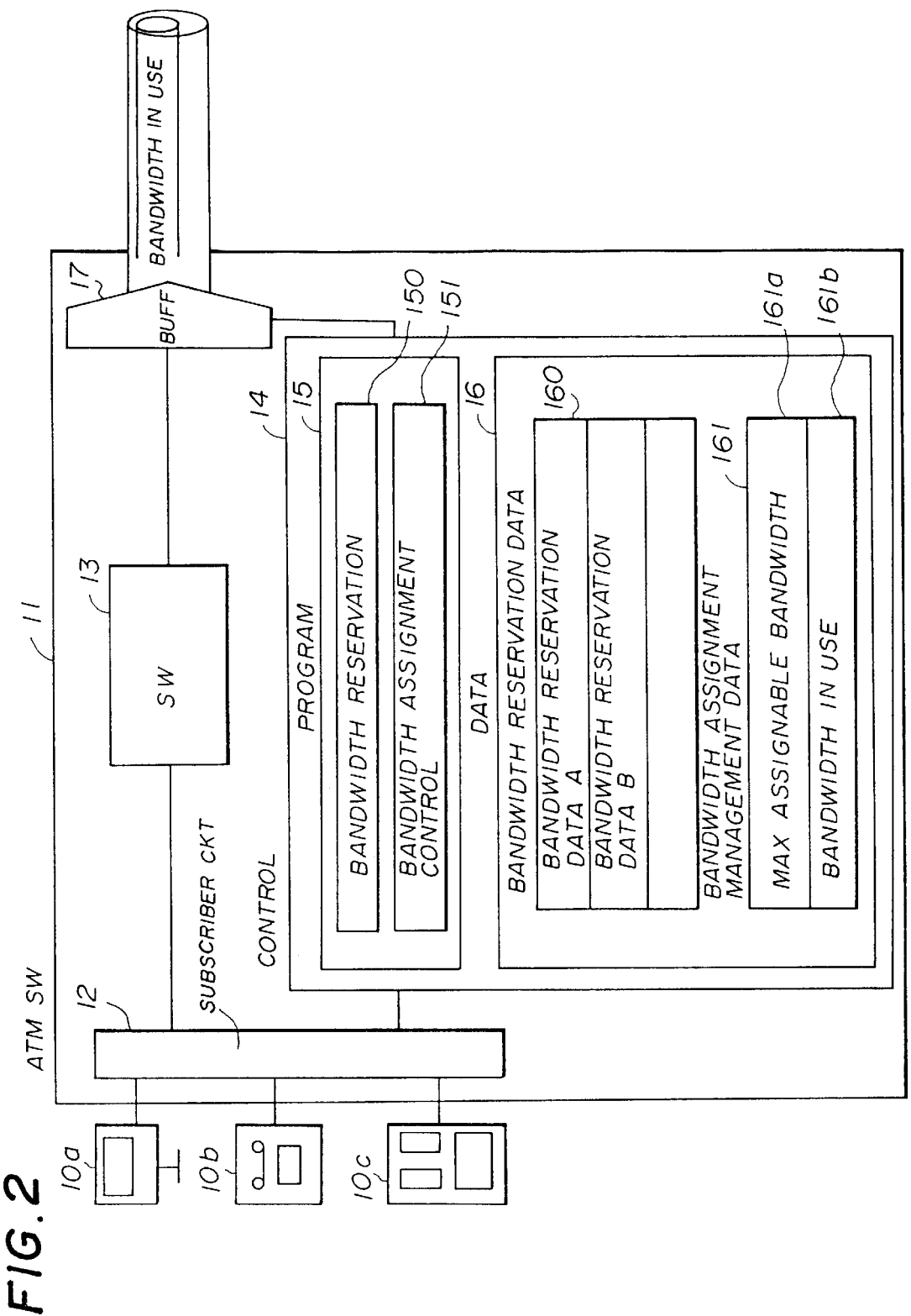
FIG. 2 is a system block diagram showing an embodiment of a trunk line bandwidth reservation system according to the present invention.

In FIG. 2, terminals 10a, 10b and 10c of users are coupled to transmission lines 18 via an ATM switching system 11. For example, the terminal 10a is a telephone terminal, the terminal 10b is a television broadcasting apparatus, and the terminal 10c is a video conference apparatus.

The ATM switching system 11 includes a subscriber circuit part 12, a switching part 13, a control part 14, and an output line buffer part 17 which are connected as shown. The control part 14 includes a program part 15 and a data part 16. For example, the control part 14 is made up of a known arrangement which includes a microprocessor and a memory which stores programs of the program part 15 and data of the data part 16, and carries out the operations of the program part 15 by executing the programs of the program part 15 in the microprocessor using the data stored in the data part 16. The program part 15 includes a bandwidth reservation part 150 and a bandwidth assignment control part 151. The data part 16 includes a bandwidth reservation data part 160 and a bandwidth assignment management data part 161. This bandwidth assignment management data part 161 includes a maximum bandwidth 161a which can be assigned to the transmission lines, and an in-use bandwidth 161b which indicates the bandwidth which is presently in use.

Figure 3:
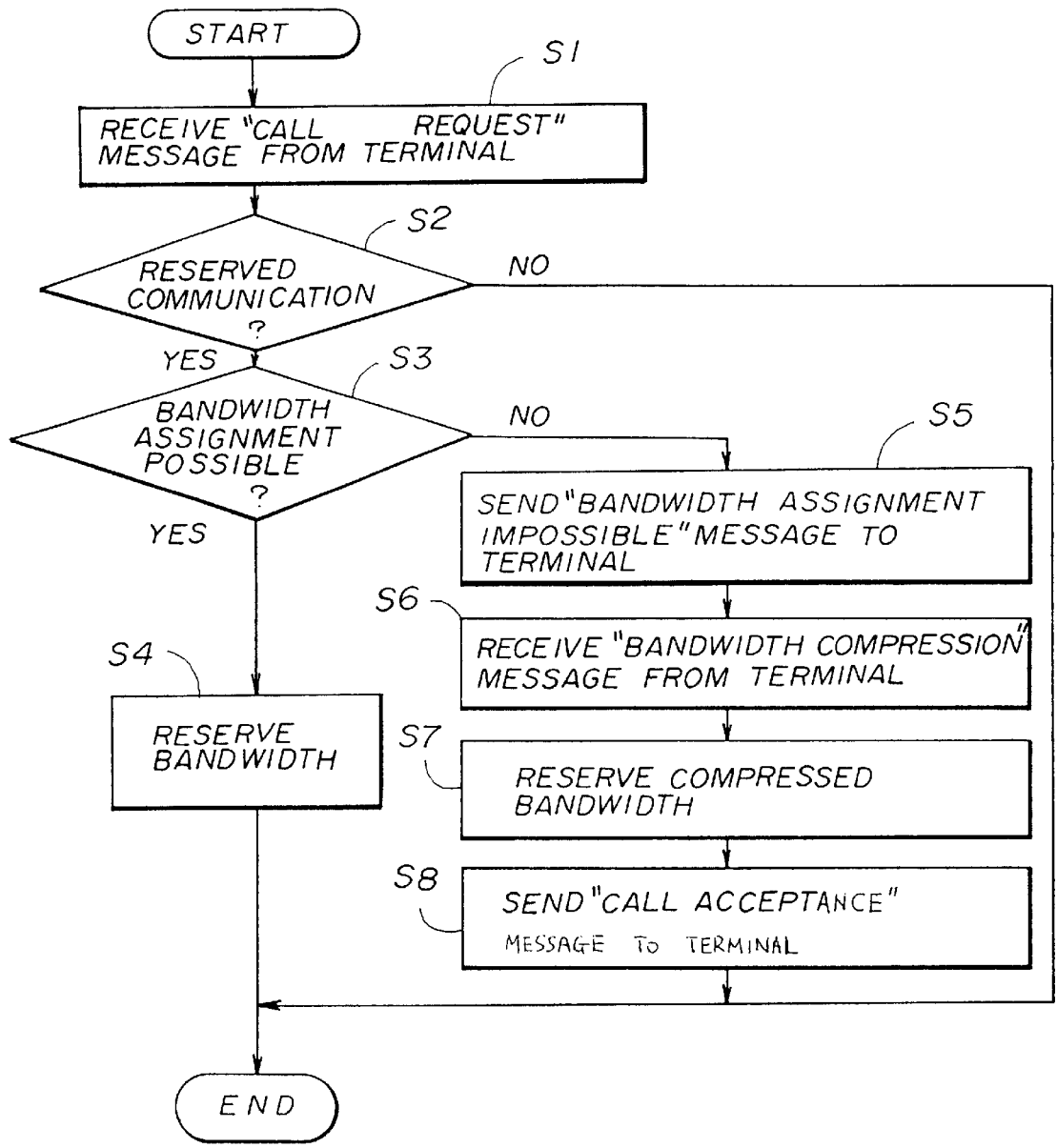
FIG. 3 is a flow chart for explaining a bandwidth reservation process.

FIG. 3 is a flow chart for explaining a bandwidth reservation process which is carried out by the bandwidth reservation part 150 shown in FIG. 2. In addition, FIG. 4 is a sequence diagram for explaining messages which are exchanged between one of the terminals 10a through 10c and the ATM switching system 11 at the start of the reserved communication. For the sake of convenience, the one of the terminals 10a through 10c will be denoted by the reference numeral 10.

If one of the terminal 10 sends a call request message SETUP to the ATM switching system 11 as indicated by "a" in FIG. 4, the bandwidth reservation part 150 of the ATM switching system 11 receives this call request message SETUP in a step S1 shown in FIG. 3. In a step S2, the bandwidth reservation part 150 decides whether or not a reserved communication is requested, based on the contents of the received message. The reservation process ends if the decision result in the step S2 is NO.

On the other hand, if the decision result in the step S2 is YES, the bandwidth reservation part 150 decides whether or not a bandwidth assignment is possible in a step S3. The decision of the step S3 is made using the reservation datum which is included in the call request message SETUP. More particularly, the reservation datum includes the time zone, the bandwidth, the terminal number and the like, and the step S3 uses the time zone and the bandwidth included in the reservation datum. The decision of the step S3 also uses the data which already exist in the bandwidth reservation data part 160 within the data part 16 shown in FIG. 2. Hence, by using these data, the step S3 decides whether or not the requested bandwidth can be assigned to the reserved communication in the requested time zone, that is, whether or not the requested bandwidth is less than or equal to the maximum bandwidth which can be assigned in the requested time zone. If the decision result in the step S3 is YES, the bandwidth reservation part 150 carries out the bandwidth reservation in a step S4 by storing the reservation datum which is included in the call request into the bandwidth reservation data part 160 shown in FIG. 2. FIG. 2 shows a case where the bandwidth reservations are made and bandwidth reservation data A and B are stored in the bandwidth reservation data part 160. The reservation process ends after the step S4.

On the other hand, if the decision result in the step S3 is NO, the bandwidth reservation part 150 in a step S5 sends a message which indicates that the bandwidth assignment cannot be made to the terminal 10, as indicated by "b" in FIG. 4. In response to this message, the bandwidth reservation part 150 in a step S6 receives from the terminal 10 a message which specifies compression of the bandwidth, as indicated by "c" in FIG. 4. In a step S7, the bandwidth reservation part 150 carries out the bandwidth reservation for the compressed bandwidth. Then, in a step S8, the bandwidth reservation part 150 sends to the terminal 10 a message which indicates that the call request is accepted, as indicated by "d" in FIG. 4. Hence, the reservation process ends after the step S8. Thereafter, the communication between the terminal 10 and the ATM switching system 11 starts and the communication is made as indicated by "e" in FIG. 4.

If the bandwidth assignment cannot be made in the process shown in FIG. 3, it is possible to simply end the process by sending to the terminal 10 a message which indicates that the bandwidth assignment cannot be made. However, especially in the case of a terminal which processes image data, a circuit (codec) is provided in the terminal for carrying out the bandwidth compression. For this reason, although the image quality slight deteriorates, this embodiment compresses the bandwidth and transmits the essence of the image data in a narrow band, rather than not making the image data transmission.

Next, a description will be given of a connect request accept process of the bandwidth assignment control part 151 of the program part 15 shown in FIG. 2, by referring to flow charts of FIGS. 5 and 6.

If the ATM switching system 11 receives a connect request from the terminal 10, the bandwidth assignment control part 151 judges the present time zone in a step S11. This judgement is made by identifying the reserved time (time when the use of the reserved bandwidth is to start) which is stored in the bandwidth reservation data part 160 shown in FIG. 2 so as: (i) to determine whether the present time matches the reserved time, (ii) to determine whether the present time falls within a supervision time zone which includes a predetermined time before the reserved time, and (iii) to determine whether the present time does not match the reserved time or fall within the supervision time zone. In FIG. 5, the case (i) above is indicated by "=reserved time", the case (ii) above is indicated by "=supervision time zone", and the case (iii) above is indicated by "other".

Next, a description will be given of the manner in which a call request from another terminal is treated before the reserved time, by referring to FIG. 7.

Figure 7A:
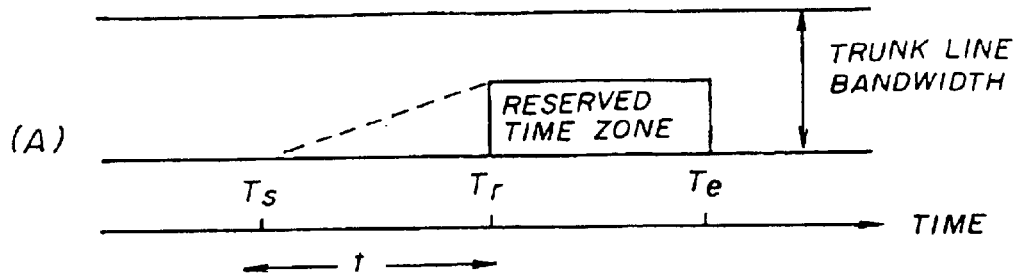
FIG. 7 in parts (A), (B) and (C) is a diagram for explaining a call request from another terminal before a reserved time.
Figure 7B:
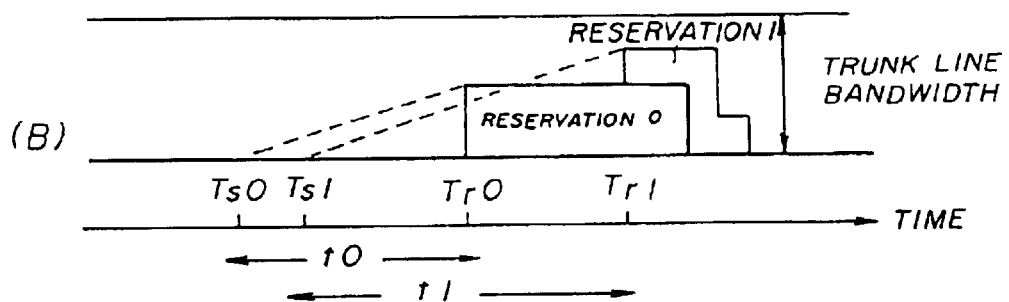
Figure 7C:
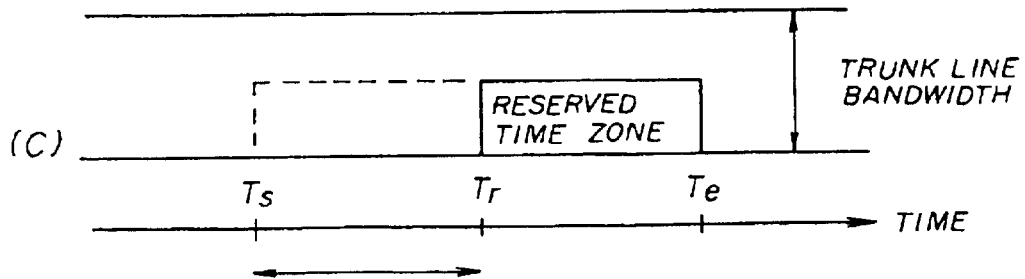

In FIG. 7, (A) shows a case where a user makes a reservation by specifying a reserved time zone and the bandwidth to be used, where the reserved time zone starts from the start time $T_r$ and ends at an end time $T_e$. In this case, the bandwidth assignment control part 151 may not be able to assign the reserved bandwidth immediately when the connect request from the user is accepted at the start time $T_r$. In other words, if another terminal starts the use of a large bandwidth before the start time $T_r$ of the reserved connect request and the large bandwidth is still in use by this other terminal at the start time $T_r$, the reserved bandwidth cannot be assigned to the user even though the user has made the reservation in advance. Hence, in order to avoid this undesirable situation, this embodiment sets a time $T_s$ which is a predetermined time t before the start time $T_r$, and the supervision time zone is defined as the time t from the time $T_s$ to the start time $T_r$. The bandwidth assignment control part 151 assigns the bandwidth to the other terminal which is other than the terminal which has made the reservation in advance, by taking into consideration an apparent reserved bandwidth which gradually increases from the time $T_s$ to the start time $T_r$ as indicated by a dotted line.

The apparent reserved bandwidth reaches the actual reserved bandwidth at the start time $T_r$. For this reason, it is possible to prevent the undesirable situation described above. Of course, the apparent reserved bandwidth may increase linearly as shown in FIG. 7 (A) or, increase with an arbitrary curve or function.

In FIG. 7, (B) shows a case where a plurality of reservations exist. In this particular case, reservations "0" and "1" are stored in the bandwidth reservation data part 160 as the bandwidth reservation data A and B shown in FIG. 2. The reservation "0" has a start time $T_{r0}$, and the reservation "1" has a start time $T_{r1}$. A time $T_{s0}$ is set a predetermined time t0 before the start time $T_{r0}$, and a time $T_{s1}$ is set a predetermined time t1 before the start time $T_{r1}$. Hence, a supervision is made with respect to the reservation "0" during the supervision time zone t0 from the time $T_{s0}$ to the start time $T_{r0}$, and a supervision is made with respect to the reservation "1" during the supervision time zone t1 from the time $T_{s1}$ to the start time $T_{r1}$. Accordingly, the supervision is made with respect to both the reservation "0" and the reservation "1" from the time $T_{s1}$ to the time $T_{r0}$.

Of course, the apparent reservation bandwidths related to the reservations "0" and "1" may each increase linearly or, with an arbitrary curve or function, similarly to the case described above in conjunction with FIG. 7 (B). In addition, the manner in which the apparent reservation bandwidths related to the reservations "0" and "1" increase may be independent of each other.

In FIG. 7, (C) shows a case where the apparent reservation bandwidth is set fixed, that is, equal to the actual reserved bandwidth starting from the time $T_s$. In FIG. 7 (C), those parts which are the same as those corresponding parts in FIG. 7 (A) are designated by the same reference numerals, and a description thereof will be omitted.

Returning now to the description of FIG. 5, the process of the bandwidth assignment control part 151 advances to a step S13 if the present time matches the reserved time in the step S11. The process advances to a step S18 shown in FIG. 6 if the present time falls within the supervision time zone in the step S11. Furthermore, the process otherwise advances to a step S12. The bandwidth assignment process is carried out regardless of the reservation, that is, a normal accept process, is carried out in the step S12.

In the step S13 shown in FIG. 5, the bandwidth assignment control part 151 decides whether or not the connect request is received from the terminal which has made the reservation in advance to start the reserved communication from this reserved time. The process advances to the step S18 shown in FIG. 6 if the decision result in the step S13 is NO. On the other hand, the process advances to a step S14 if the decision result in the step S13 is YES.

The bandwidth assignment control part 151 extracts the reserved bandwidth from the bandwidth reservation data part 160 in the step S14. In addition, in a step S15, the bandwidth assignment control part 151 adds the extracted reserved bandwidth and the bandwidth 161b which is in use and is extracted from the bandwidth assignment management data part 161, and decides whether or not the sum has reached the maximum bandwidth 161a which can be assigned and is extracted from the bandwidth assignment management data part 161.

If the decision result in the step S15 is YES, the bandwidth assignment control part 151 in a step S16 carries out a alternate/forced disconnect process which will be described later with respect to the terminal from which the connect request is received. On the other hand, if the decision result in the step S15 is NO, the bandwidth assignment control part 151 in a step S17 adds the reserved bandwidth to the bandwidth which is in use, and the band assignment process ends. Thereafter, the control part 14 carries out processes such as call accept and call setup with respect to the remote end user, and the communication starts.

If the present time is included in the supervision time as shown in FIG. 7 or, present time matches the reserved time but the connect request is received from a terminal other than the terminal which made the reservation in advance, the process advances to the step S18 shown in FIG. 6. In the step S18, the bandwidth assignment control part 151 extracts the reserved bandwidth from the bandwidth reservation data part 160. Then, in a step S19, the bandwidth assignment control part 151 calculates a bandwidth BW based on the following formula (1) and decides whether or not the calculated bandwidth BW has reached the maximum bandwidth 161a which can be assigned, where the "accepted bandwidth" in the formula corresponds to the bandwidth of the call for which the connect request is presently received.

$$BW = \text{(accepted bandwidth)} + \text{(bandwidth which is in use)} + \text{(reserved bandwidth)} \quad (1)$$

If the decision result in the step S19 is NO, the bandwidth assignment control part 151 in a step S20 adds the accepted bandwidth to the bandwidth which is in use, and the assignment process ends. On the other hand, if the decision result in the step S19 is YES, the bandwidth assignment control part 151 in a step S21 requests a restrict process and the process ends. The restrict process sends a message which indicates that the request cannot be accepted to the terminal from which the connect request is received or, makes an alternative trunking using another trunk line.

The step S15 shown in FIG. 5 decides whether or not there is a bandwidth which can be assigned, and the step S16 carries out the following alternate/forced disconnect process if the decision result in the step S15 is YES.

(1) With respect to the reserved communication, a decision is made to determine whether or not an alternative trunking can be made to another trunk line. If such an alternative trunking is possible, the call or communication being made continues as it is.

(2) On the other hand, if the alternative trunking is impossible, the reserved bandwidth is secured by forcibly disconnecting the calls starting from the call which is other than the reserved call and has a lowest priority.

On the other hand, if the decision result in the step S15 is YES in FIG. 5, it is possible to carry out a step S16' as indicated by a dotted line. This step S16' can be carried out if the user who makes the reserved communication has registered in advance, as a part of the bandwidth reservation datum, compression information which indicates whether or not the communication is possible using a reduced bandwidth by compressing the bandwidth. For example, the compression information includes data indicating the compressed bandwidth to be used. If it is found from the compression information that the bandwidth can be compressed, a decision is made to determine whether or not the bandwidth amounting to the compressed bandwidth specified by the compression information. In other words, a decision similar to that made in the step S15 is made with respect to the compressed bandwidth. If the bandwidth amounting to the compressed bandwidth can be assigned to the terminal, a message is sent to the terminal from which the connect request is received so as to instruct a communication using the compressed bandwidth. Therefore, the compressed bandwidth is assigned and the communication using the compressed bandwidth is started.

FIG. 8 shows an embodiment of the exchange of messages between the terminal 10 and the ATM switching system 11 at the end of the reserved communication. The reserved communication is made as indicated by "a" in FIG. 8. If the reserved time zone is exceeded and the end time is reached, a disconnect message is sent from the terminal 10 as indicated by "b" in FIG. 8. On the other hand, the ATM switching system 11 investigates the bandwidths used within the transmission lines 18 and the state of other reservations. If the ATM switching system 11 decides that there is a sufficient large bandwidth available within the transmission lines 18, the ATM switching system 11 makes an inquiry the terminal 10 as indicated by "c", so as to inquire whether the bandwidth used up to that time should continue to be secured or be released. If the terminal 10 desires the bandwidth to be secured continuously for the purpose of emergency broadcasting or the like, a message is sent to the ATM switching system 11 as indicated by "d" so as to make a bandwidth continuous-use request. In response to this message from the terminal 10, the ATM switching system 11 secures the requested bandwidth as indicated by "e". In this state, the terminal 10 can make a communication at any time using the bandwidth which is continuously secured.

Next, a description will be given of a case where the terminal 10 which has registered the bandwidth to be used by making a reservation does not make a connect request at the reserved time, by referring to FIG. 9. In this case, the reservation having the start time $T_r$ is accepted until a predetermined time s elapses, and the reservation is cancelled after the time $T_r$+s. The bandwidth reservation datum of the terminal 10 is deleted by cancelling the reservation. In this case, it is possible to compare the time $T_r$+s and the end time $T_e$ of the reserved communication and determine which occurs first, and to cancel the reservation at the time when whichever occurs first.

Of course, the present invention is similarly applicable to an external control unit which carries out an operation which is linked to the ATM switching system.

Further, the present invention is not limited to these embodiments, but various variations and modifications may be made without departing from the scope of the present invention.

What is claimed is:

1. A trunk line bandwidth reservation system for an asynchronous transfer mode switching system which is coupled to a plurality of terminals, said trunk line bandwidth reservation system comprising:

data storage means, having an input and an output, for receiving and storing reservation data and outputting reservation data when accessed;

bandwidth reservation means, coupled to the output of said data storage means, for registering reservation datum which includes at least a time zone and a reserved bandwidth to be used by a reserved communication into said data storage means in response to a reservation request which includes the reservation datum and is generated from a first terminal before the time zone, said time zone starting from a reserved start time; and bandwidth assignment means, coupled to said bandwidth reservation means, for assigning the reserved bandwidth to the first terminal in response to a connect request which is generated from the first terminal at the reserved start time, and for assigning an available bandwidth to a second terminal in response to a connect request which is generated from the second terminal by judging the available bandwidth based on a bandwidth which is presently in use and the reserved bandwidth which is secured by the reservation datum accessed from said data storage means, said second terminal being other than the first terminal and the connect request generated by said second terminal is not associated with said reservation request or another reservation request and wherein, said data storage means, said bandwidth reservation means and said bandwidth assignment means are provided within the asynchronous transfer mode system.

2. The trunk line bandwidth reservation system as claimed in claim 1, wherein said bandwidth assignment means sets a supervision time zone which starts a predetermined time before the reserved start time and judges whether or not a present time falls within the supervision time zone in response to the connect request from the second terminal, said bandwidth assignment means judging the available bandwidth based on an apparent reserved bandwidth which gradually increases from a start of the supervision time to the reserved start time with an arbitrary function.

3. The trunk line bandwidth reservation system as claimed in claim 2, wherein said bandwidth assignment means rejects the connect request generated from the second terminal if a bandwidth requested thereby is larger than the available bandwidth.

4. The trunk line bandwidth reservation system as claimed in claim 2, wherein said bandwidth assignment means sets a supervision time zone with respect to a reserved start time of each of the reservation data stored in said data storage means, and judges the available bandwidth based on each of apparent reserved bandwidths.

5. The trunk line bandwidth reservation system as claimed in claim 2, wherein said bandwidth assignment means includes means for sending a message to the first terminal if the available bandwidth at the reserved start time is smaller than the reserved bandwidth, said message requesting compression of the reserved bandwidth or cancellation of the connect request.

6. The trunk line bandwidth reservation system as claimed in claim 5, wherein said bandwidth assignment means includes means for assigning a compressed bandwidth as the reserved bandwidth in response to a message which is generated from the first terminal and selects compression of the reserved bandwidth.

7. The trunk line bandwidth reservation system as claimed in claim 2, wherein said bandwidth assignment means sets a supervision time zone which starts a predetermined time before the reserved start time and judges whether or not a present time falls within the supervision time zone in response to the connect request from the second terminal, said bandwidth assignment means judging the available bandwidth based on an apparent reserved bandwidth which is smaller than a maximum bandwidth of the trunk line by the reserved bandwidth starting from a start of the supervision time to the reserved start time.

8. The trunk line bandwidth reservation system as claimed in claim 7, wherein said bandwidth assignment means rejects the connect request generated from the second terminal if a bandwidth requested thereby is larger than the available bandwidth.

9. The trunk line bandwidth reservation system as claimed in claim 7, wherein said bandwidth assignment means sets a supervision time zone with respect to a reserved start time of each of the reservation data stored in said data storage means, and judges the available bandwidth based on each of apparent reserved bandwidths.

10. The trunk line bandwidth reservation system as claimed in claim 7, wherein said bandwidth assignment means includes means for sending a message to the first terminal if the available bandwidth at the reserved start time is smaller than the reserved bandwidth, said message requesting compression of the reserved bandwidth or cancellation of the connect request.

11. The trunk line bandwidth reservation system as claimed in claim 10, wherein said bandwidth assignment means includes means for assigning a compressed bandwidth as the reserved bandwidth in response to a message which is generated from the first terminal and selects compression of the reserved bandwidth.

12. The trunk line bandwidth reservation system as claimed in claim 1, wherein said bandwidth assignment means includes means for sending a message to the first terminal if an available bandwidth at the end of the reserved communication is greater than a predetermined value, said message requesting release of the reserved bandwidth or continued reservation of the reserved bandwidth.

13. The trunk line bandwidth reservation system as claimed in claim 1, which further comprises means for cancelling the reserved communication if the connect request associated therewith is not generated from the first terminal after a predetermined time from the reserved start time.

14. A trunk line bandwidth reservation system for an asynchronous transfer mode switching system which is coupled to a plurality of terminals, said trunk line bandwidth reservation system comprising:

a data storage, having an input and an output, to receive and store reservation data and to output reservation data when accessed;

a bandwidth reservation section, coupled to the output of said data storage, to register a reservation datum which includes at least a time zone and a reserved bandwidth to be used by a reserved communication into said data storage in response to a reservation request which includes the reservation datum and is generated from a first terminal before the time zone, said time zone starting from a reserved start time; and a bandwidth assignment section, coupled to said bandwidth reservation section, to assign the reserved bandwidth to the first terminal in response to a connect request which is generated from the first terminal at the reserved start time, and to assign an available bandwidth to a second terminal in response to a connect request which is generated from the second terminal by judging the available bandwidth based on a bandwidth which is presently in use and the reserved bandwidth which is secured by the reservation datum accessed from said data storage, said second terminal being other than the first terminal and the connect request generated by said second terminal is not associated with said reservation request or another reservation request, and wherein, said data storage, said bandwidth reservation section and said bandwidth assignment section are provided within the asynchronous transfer mode switching system.

* * * * *